(12) United States Patent
Yamaguchi

(10) Patent No.: US 11,436,693 B2
(45) Date of Patent: Sep. 6, 2022

(54) MACHINE LEARNING DEVICE AND MACHINE LEARNING METHOD FOR LEARNING CORRELATION BETWEEN SHIPMENT INSPECTION INFORMATION AND OPERATION ALARM INFORMATION FOR OBJECT

(71) Applicant: FANUC CORPORATION, Yamanashi (JP)

(72) Inventor: Akira Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 434 days.

(21) Appl. No.: 15/725,437

(22) Filed: Oct. 5, 2017

(65) Prior Publication Data

US 2018/0101924 A1 Apr. 12, 2018

(30) Foreign Application Priority Data

Oct. 12, 2016 (JP) .............................. JP2016-200840

(51) Int. Cl.
*G06Q 50/28* (2012.01)
*G06N 20/00* (2019.01)
*G06N 3/04* (2006.01)
*G06N 5/02* (2006.01)
*G08B 19/00* (2006.01)

(52) U.S. Cl.
CPC .......... *G06Q 50/28* (2013.01); *G06N 3/0454* (2013.01); *G06N 5/022* (2013.01); *G06N 20/00* (2019.01); *G08B 19/00* (2013.01)

(58) Field of Classification Search
CPC ........ G06Q 50/28; G06N 20/00; G06N 5/022; G06N 3/0454; G08B 19/00
USPC .......................................................... 706/12
See application file for complete search history.

(56) References Cited

U.S. PATENT DOCUMENTS 5,751,910 A * 5/1998 Bryant ................ G06N 3/0436
706/2
6,438,470 B1 8/2002 Hiramatsu
(Continued)

FOREIGN PATENT DOCUMENTS

CN 103843015 A 6/2014
CN 104731664 A 6/2015
(Continued)

OTHER PUBLICATIONS

β-Series Servo Motor Maintenance Manual B-65235EN/02 (Year: 1997).*
(Continued)

*Primary Examiner* — Kakali Chaki
*Assistant Examiner* — Ababacar Seck
(74) *Attorney, Agent, or Firm* — Hauptman Ham, LLP

(57) ABSTRACT

A machine learning device which learns a correlation between shipment inspection information obtained by inspecting an object in shipment thereof and operation alarm information issued during operation of the object, includes a state observation unit which observes the shipment inspection information and the operation alarm information; and a learning unit which generates a learning model based on the shipment inspection information and the operation alarm information observed by the state observation unit.

18 Claims, 3 Drawing Sheets

(56) References Cited

U.S. PATENT DOCUMENTS

| | | | |
|---|---|---|---|
| 7,810,724 B2* | 10/2010 | Skaaksrud | G06Q 10/08 235/375 |
| 2004/0267397 A1 | 12/2004 | Doddi et al. | |
| 2005/0002560 A1* | 1/2005 | Yamamoto | G06K 9/3233 382/156 |
| 2006/0022679 A1* | 2/2006 | Obata | G01R 31/346 324/551 |
| 2009/0164434 A1* | 6/2009 | Sakurai | G06F 16/38 |
| 2012/0316835 A1* | 12/2012 | Maeda | G01D 3/08 702/183 |
| 2013/0134910 A1* | 5/2013 | Iwashita | H02P 3/14 318/376 |
| 2013/0262349 A1* | 10/2013 | Bouqata | G06N 20/00 706/12 |
| 2014/0070743 A1* | 3/2014 | Yoshida | H02P 29/024 318/400.22 |
| 2014/0156057 A1* | 6/2014 | Tong | G05B 19/4065 700/175 |
| 2014/0257530 A1 | 9/2014 | Misoka | |
| 2014/0306640 A1* | 10/2014 | Yamamoto | H02P 27/08 318/504 |
| 2014/0354298 A1* | 12/2014 | Obata | G01R 31/346 324/546 |
| 2015/0105874 A1* | 4/2015 | Miyazaki | G05B 15/02 700/80 |
| 2015/0293523 A1* | 10/2015 | Yamamoto | G05B 19/4065 700/175 |
| 2017/0031329 A1* | 2/2017 | Inagaki | B25J 9/163 |
| 2017/0124487 A1* | 5/2017 | Szeto | G06Q 30/0204 |
| 2018/0060702 A1* | 3/2018 | Ma | G06K 9/6269 |
| 2018/0095778 A1* | 4/2018 | Aydelott | G06F 9/5044 |

FOREIGN PATENT DOCUMENTS

| | | |
|---|---|---|
| DE | 19914865 A1 | 10/2000 |
| JP | 07-174616 A | 7/1995 |
| JP | 2002-334130 A | 11/2002 |
| JP | 2004-86897 A | 3/2004 |
| JP | 2004-354250 A | 12/2004 |
| JP | 2005-33959 A | 2/2005 |
| JP | 2007528985 A | 10/2007 |
| JP | 2013-97713 A | 5/2013 |
| JP | 2016-148747 A | 8/2016 |
| JP | 5964488 B1 | 8/2016 |
| WO | 2005/003911 A2 | 1/2005 |

OTHER PUBLICATIONS

From Model, Signal to Knowledge: A Data-Driven Perspective of Fault Detection and Diagnosis Xuewu Dai, Member, IEEE, and Zhiwei Gao, Senior Member, IEEE (Year: 2013).*
GE Fanuc Automation Computer Numerical Control Products (Year: 2000).*
Identifying three-phase induction motor faults using artificial neural networks Kolla et al. (Year: 2000).*
Electric Motor Storage McElveen et al. (Year: 2013).*
Clustering of the Self-Organizing Map based Approach in Induction Machine Rotor Faults Diagnostics AROUI et al. (Year: 2009).*

* cited by examiner

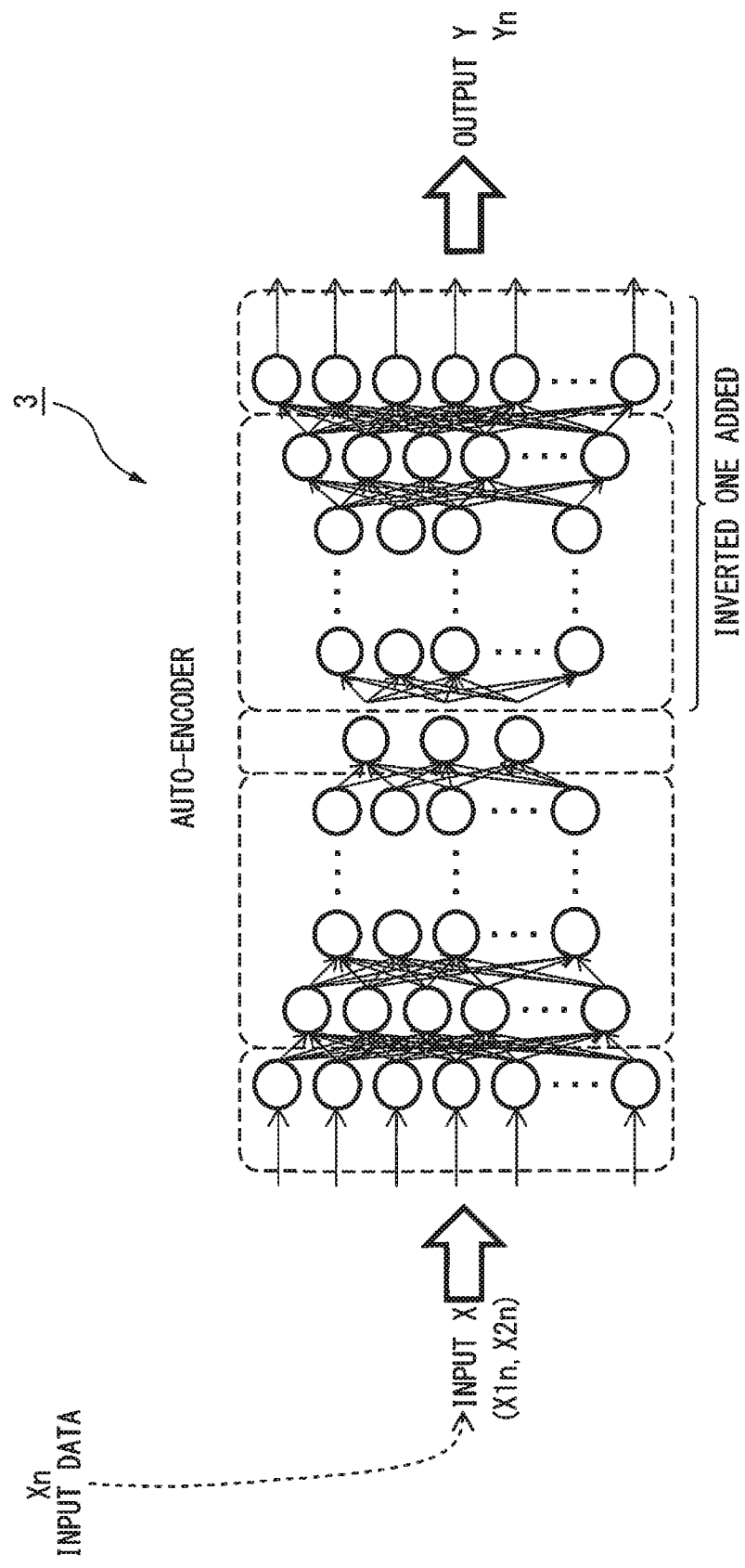

MACHINE LEARNING DEVICE AND MACHINE LEARNING METHOD FOR LEARNING CORRELATION BETWEEN SHIPMENT INSPECTION INFORMATION AND OPERATION ALARM INFORMATION FOR OBJECT

RELATED APPLICATIONS

The present application claims priority to Japanese Patent Application No. 2016-200840 filed Oct. 12, 2016, the disclosure of which is hereby incorporated by reference herein in its entirety.

BACKGROUND OF THE INVENTION

1. Field of the Invention

The present invention relates to a machine learning device and a machine learning method for learning the correlation between shipment inspection information and operation alarm information for an object.

2. Description of the Related Art

Conventionally, electric motors (motors: objects) have been used for a variety of electrical machines and devices including, e.g., machine tools and robots controlled by computer numerical control (CNC) devices. Such motors normally undergo shipment inspection in shipping products such as machine tools or robots, which are then delivered to users. This shipment inspection is conducted in shipping not only products which use motors but also, e.g., the motors themselves, both of which are then delivered to users. In this specification, information obtained by inspecting a motor or a product which uses the motor in shipment will be referred to as shipment inspection information hereinafter.

After being delivered to users, products (motors) such as machine tools or robots are used (operated) in, e.g., actual fields, but alarms may be issued during the operation of the machine tools or the like. The alarms are issued during the operation due to various factors including, e.g., electrical problems based on, e.g., motor insulation failure or servo amplifier failure or mechanical (structural) problems based on, e.g., bearing failure or metal fatigue. In this specification, information concerning an alarm issued during the operation of a motor or a product which uses the motor will be referred to as operation alarm information hereinafter.

In this specification, a motor (a product which uses the motor) will be mainly taken as an example of an object targeted for learning the correlation between shipment inspection information and operation alarm information by machine learning, but the object is not limited to a motor, and various objects whose shipment inspection information and operation alarm information may be acquired, including, e.g., a servo amplifier which performs servo driving of a motor, may be applicable.

The correlation between shipment inspection information and operation alarm information for an object (motor), as described above, has conventionally attracted little attention, and even if the shipment inspection information and the operation alarm information for the motor have a certain correlation, persons may expend enormous efforts to analyze (organize) this correlation.

In addition, since, for example, the use conditions (e.g., the ambient temperature or humidity, the running time, and the magnitude of the load in use) of each individual motor (including motors used for a variety of electrical machines and devices) significantly vary for each field of actual use, it is difficult for persons to comprehend the actual use conditions and elucidate the correlation between shipment inspection information and operation alarm information for this motor.

Incidentally, hitherto, for example, Japanese Laid-Open Patent Publication No. H07-174616 discloses an inspection device which inspects an object such as a compact motor for abnormalities on the basis of vibration of the object or a sound emitted by the object. The inspection device detects vibration of the object or a sound emitted by the object using a sensor, performs envelope detection and Fourier transformation, calculates a certainty factor for the presence of an abnormality of the object using an arithmetic unit, further calculates a certainty factor for the presence of an abnormality of the object by inputting a feature vector signal representing the features of Fourier transform signals to a neural network, performs fuzzy computation based on the certainty factors calculated by both the arithmetic unit and the neural network, and determines the presence or absence of an abnormality of the object.

Further, Japanese National Publication of International Patent Application No. 2007-528985, for example, discloses a technique for optically measuring a structure formed on a semiconductor wafer, using a machine learning system. In other words, in a method for inspecting a structure formed on a semiconductor wafer, a first diffraction signal measured using a measurement device is obtained, and at least one parameter which features the profile of the structure is received as input to obtain a second diffraction signal generated using the machine learning system. The first diffraction signal and the second diffraction signal are compared with each other, and when they match each other within the range of matching criteria, the shape of the structure is obtained on the basis of the profile or the at least one parameter used by the machine learning system to generate the second diffraction signal.

In addition, Japanese Laid-Open Patent Publication No. 2004-354250, for example, discloses as a defect inspection device capable of processing an image obtained by capturing an object to efficiently, accurately classify defects, a defect inspection device which uses a neural network provided in correspondence with each specific defect to be classified occurring in the process of manufacturing an object, allows learning of each neural network for each defect to be classified, and detects the presence or absence of a defect in the object for each defect to be classified by each learned neural network. The neural network includes a neural network for shot defocus defects for classifying defocus defects occurring shot by shot in the process of exposing the object, and the image size is converted in correspondence with the input layer size as preprocessing input to the neural network.

Some patent literatures of the related art conventionally disclose techniques for calculating a certainty factor for the presence of an abnormality of a motor using a neural network, or techniques for inspecting a semiconductor wafer or the like on the basis of a machine learning model, as described above.

However, no particular attention has been focused on the correlation between shipment inspection information and operation alarm information for a motor, and even though the shipment inspection information and the operation alarm information for the motor have a certain correlation, it is difficult for persons to analyze this correlation because they may expend enormous efforts, as described earlier.

In addition, since the use conditions of each individual motor significantly vary for each field of actual use, it may be very difficult for persons to comprehend the actual use conditions and elucidate the correlation between shipment inspection information and operation alarm information for this motor, and the correlation between shipment inspection information and operation alarm information for a motor, taking such actual use conditions into consideration, is evaluated on the basis of only experiences or intuitions of skilled engineers or users who have used the motor in the field for a long period of time.

In consideration of the above-described conventional problems, it is an object of the present invention to obtain a correlation between shipment inspection information and operation alarm information for an object. Obtaining a correlation between shipment inspection information and operation alarm information for an object in this manner leads to solutions to various problems such as improvements in shipment inspection items, and structural upgrading, life determination, and an improvement in quality of the object.

SUMMARY OF INVENTION

According to a first aspect of the present invention, there is provided a machine learning device which learns a correlation between shipment inspection information obtained by inspecting an object in shipment thereof and operation alarm information issued during operation of the object, including a state observation unit which observes the shipment inspection information and the operation alarm information; and a learning unit which generates a learning model based on the shipment inspection information and the operation alarm information observed by the state observation unit.

The learning unit may generate a distribution correlation between the shipment inspection information and the operation alarm information as the learning model. The machine learning device may further include an output utilization unit which outputs an inspection item in shipping the object, which influences an alarm issued during the operation of the object, based on the learning model generated by the learning unit. The learning unit may generate the learning model by clustering the shipment inspection information and the operation alarm information. The learning unit may generate the learning model by hierarchical clustering in which the shipment inspection information and the operation alarm information are arithmetically processed in a hierarchical structure, and nonhierarchical clustering in which the shipment inspection information and the operation alarm information are arithmetically processed until a predetermined number is reached based on a distance between nodes.

The machine learning device may further include a neural network. The machine learning device may be connectable to at least one different machine learning device and exchange or share the learning model generated by the learning unit of the machine learning device with the at least one different machine learning device. The machine learning device may be located on a first cloud server, and the different machine learning device may be located on a second cloud server different from the first cloud server. The object may include a motor, and the shipment inspection information may include inspection results of inspection items associated with a model of the motor and an inspection date of the motor. The object may include a servo amplifier which performs servo driving of a motor, and the shipment inspection information may include inspection results of inspection items associated with a model of the servo amplifier and an inspection date of the servo amplifier. The shipment inspection information may include at least one of an insulation resistance value, an earth resistance value, a current value, and a switching surge voltage for the object, and the operation alarm information may include at least one of an overcurrent alarm, a noise alarm, and an overload alarm for the object.

According to a second aspect of the present invention, there is provided a machine learning method for learning a correlation between shipment inspection information obtained by inspecting an object in shipment thereof and operation alarm information issued during operation of the object, including observing the shipment inspection information and the operation alarm information; and generating a learning model based on the observed shipment inspection information and operation alarm information.

The generating the learning model may include generating a distribution correlation between the shipment inspection information and the operation alarm information as the learning model. The machine learning method may further include outputting an inspection item in shipping the object, which influences an alarm issued during the operation of the object, based on the generated learning model. The generating the learning model may include generation by clustering the shipment inspection information and the operation alarm information.

BRIEF DESCRIPTION OF THE DRAWINGS

The present invention will be understood more clearly by referring to the following accompanying drawings.

FIG. 3 is a diagram for explaining another exemplary arithmetic processing applied to the machine learning device illustrated in FIG. 1.

DETAILED DESCRIPTION

Hereinafter, embodiments of a machine learning device and a machine learning method according to the present invention will be described in detail below with reference to the accompanying drawings. A motor will be mainly taken hereinafter as an example of an object targeted for learning the correlation between shipment inspection information and operation alarm information by machine learning, but the object is not limited to a motor, and various objects whose shipment inspection information and operation alarm information may be acquired, including, e.g., a servo amplifier which performs servo driving of a motor, may be applicable.

Figure 1:
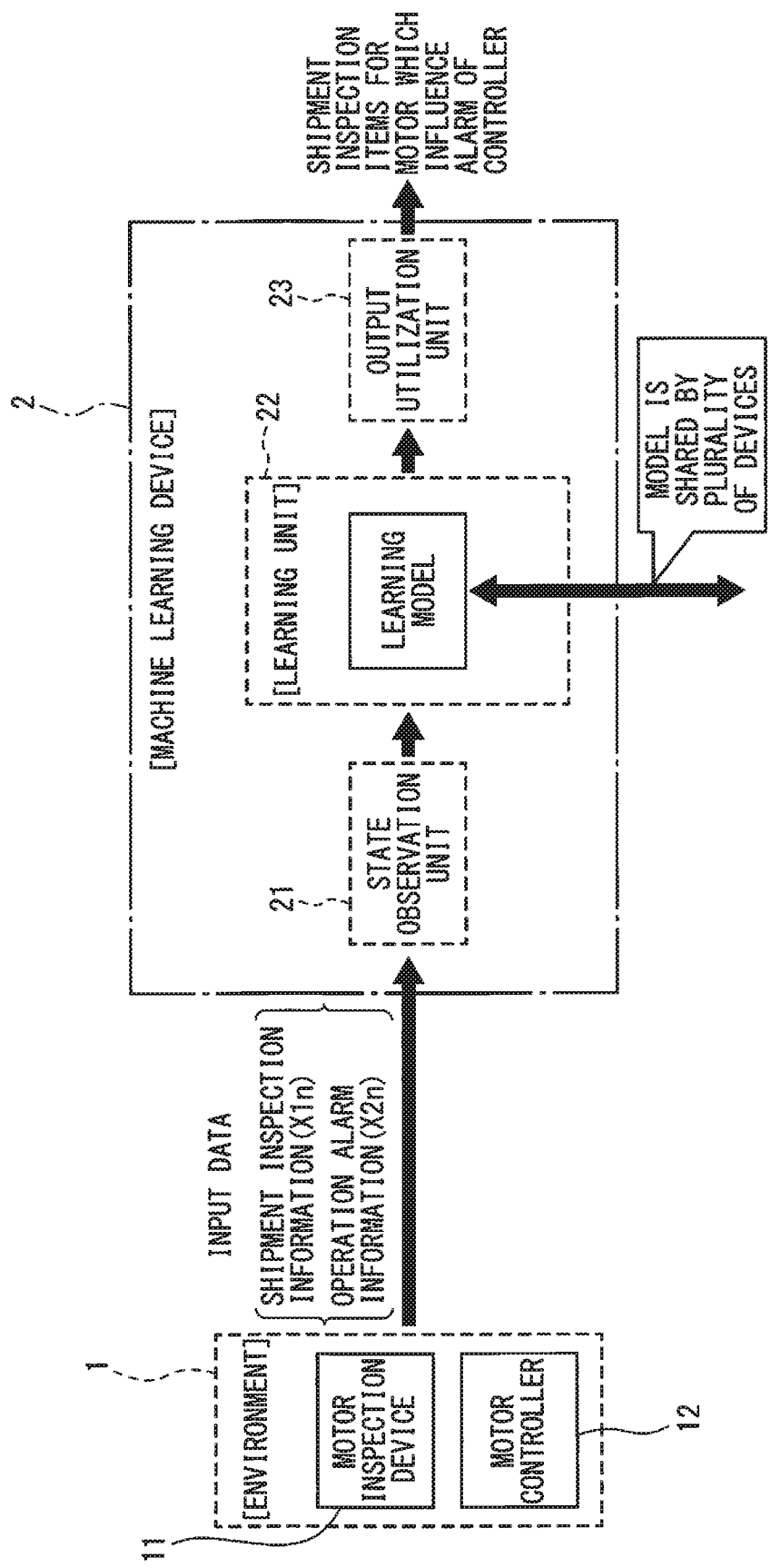
FIG. 1 is a block diagram schematically illustrating an embodiment of a machine learning device according to the present invention.

FIG. 1 is a block diagram schematically illustrating an embodiment of a machine learning device according to the present invention. A machine learning device 2 according to this embodiment includes a state observation unit 21, a learning unit 22, and an output utilization unit 23, as illustrated in FIG. 1. The state observation unit 21 observes, e.g., shipment inspection information (X1$n$) obtained by inspection in shipping a motor (object) and operation alarm information (X2$n$) issued during the operation of the motor, as data input from an environment 1.

The environment 1 includes, e.g., a motor inspection device 11 which inspects a motor in its shipment and outputs shipment inspection information (X1$n$), and a motor controller 12 which issues an alarm during the operation of the motor and outputs operation alarm information (X2$n$). The shipment inspection information (X1$n$) and the operation alarm information (X2$n$) observed by the state observation unit 21 are input to the learning unit 22, which generates a distribution correlation between the shipment inspection information (X1$n$) and the operation alarm information (X2$n$) as a learning model.

The output utilization unit 23 outputs, for example, an inspection item in shipping a motor, which influences an alarm issued during the operation of the motor, based on the learning model generated by the learning unit 22. The output utilization unit 23 may be located outside the machine learning device 2, and even the output of the output utilization unit 23 based on the learning model generated by the learning unit 22 is not limited to the above-mentioned inspection item in shipping a motor, which influences an alarm issued during the operation of the motor.

The learning unit 22 applies "unsupervised learning" to the shipment inspection information (X1$n$) and the operation alarm information (X2$n$) to generate a learning model by, e.g., clustering. In other words, the learning unit 22 generates a learning model by hierarchical clustering in which the shipment inspection information (X1$n$) and the operation alarm information (X2$n$) are arithmetically processed in a hierarchical structure, or nonhierarchical clustering in which the shipment inspection information (X1$n$) and the operation alarm information (X2$n$) are arithmetically processed until a predetermined number is reached based on the distance between nodes.

Figure 2:
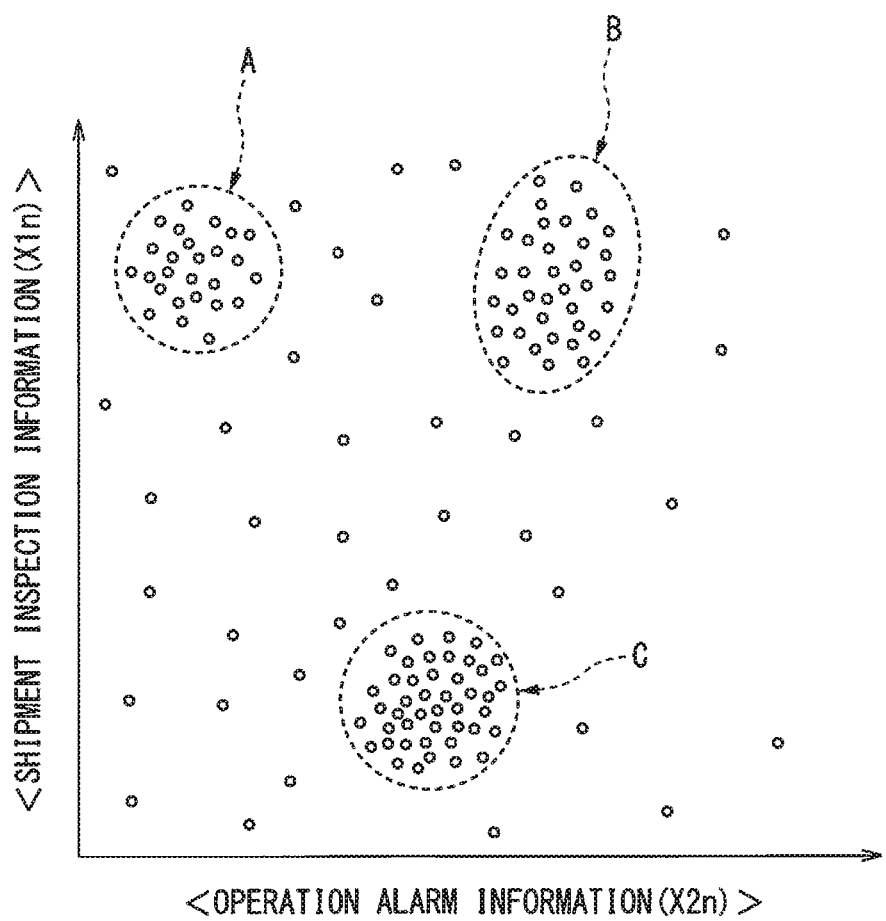
FIG. 2 is a plot for explaining exemplary arithmetic processing applied to the machine learning device illustrated in FIG. 1.

FIG. 2 is a plot for explaining exemplary arithmetic processing applied to the machine learning device illustrated in FIG. 1, i.e., explaining nonhierarchical clustering (clustering based on the k-means method). FIG. 3 is a diagram for explaining another exemplary arithmetic processing applied to the machine learning device illustrated in FIG. 1, and illustrates an exemplary neural network applied to an auto-encoder for dimensional compression in hierarchical clustering.

The machine learning device (machine learning method) according to this embodiment employs "unsupervised learning" to perform clustering, and thus extracts, e.g., a useful rule, a knowledge representation, and a determination criterion by analysis from input data of shipment inspection information (X1$n$) and operation alarm information (X2$n$), outputs the determination results, and learns knowledge (machine learning). The machine learning device 2 uses, e.g., a neural network, but in actually implementing the machine learning device 2, a general-purpose computer or processor may be used, while the use of general-purpose computing on graphics processing units (GPGPU) or large-scale PC clusters allows higher-speed processing.

In unsupervised learning, only input data are fed into the machine learning device 2 in large amounts to learn the distribution of the input data to, e.g., compress, classify, and shape the input data without corresponding teacher output data, unlike "supervised learning." This allows, e.g., clustering of features seen in sets of input data into similar features, and on the basis of the obtained result, any norm may be defined and outputs are allocated to optimize it, thus predicting output. "Unsupervised learning" in this specification refers to broadly-defined "unsupervised learning" including, e.g., an intermediate between "supervised learning" and "unsupervised learning," called "semi-supervised learning."

More specifically, as illustrated in FIG. 2, the machine learning device 2 (learning unit 22) may receive shipment inspection information (X1$n$) and operation alarm information (X2$n$) and perform, e.g., clustering until a predetermined number (e.g., k=3) is reached based on the distance between nodes (the distance between dots in FIG. 2) to obtain clusters A, B, and C. In other words, clusters A, B, and C based on the correlation between shipment inspection information (X1$n$) and operation alarm information (X2$n$) for a motor (object) may be obtained.

As illustrated in FIG. 3, when, for example, input shipment inspection information (X1$n$) and operation alarm information (X2$n$) for a motor are hierarchized and clustered, a neural network 3 is applicable as an auto-encoder for dimensional compression. Shipment inspection information (X1$n$) and operation alarm information (X2$n$) for a motor, for example, are used as input X (input data Xn) of the neural network (auto-encoder) 3, and hierarchically clustered output data Yn is output as output Y. The nonhierarchical clustering represented in FIG. 2 and the hierarchical clustering represented in FIG. 3 are merely examples, and various known "unsupervised learning" methods are naturally applicable to the machine learning device 2 according to this embodiment.

The machine learning device 2 according to this embodiment may be located on, e.g., a server of a manufacturer, as will be described in detail later, but the machine learning device 2 is connectable to at least one different machine learning device and may exchange or share a learning model generated by the learning unit (22) of each machine learning device (2) with the at least one different machine learning device. The servers equipped with these machine learning devices 2 may be implemented as, e.g., different cloud servers accessible via a communication line such as the internet.

In this manner, with the machine learning device (machine learning method) according to this embodiment, a correlation (e.g., clusters A, B, and C in FIG. 2) between shipment inspection information and operation alarm information for an object (motor) may be obtained. Examples of the obtained correlation may include various correlations such as that between the surge voltage in the shipment inspection information and a noise alarm (an alarm for a communication error) in the operation alarm information, and that between the earth resistance in the shipment inspection information and an alarm for a communication error in the operation alarm information. Obtaining a correlation between shipment inspection information and operation alarm information for an object may result in solutions to various problems such as improvements in shipment inspection items, and structural upgrading, life determination, and an improvement in quality of the object.

An application example of the machine learning device (machine learning method) according to this embodiment will be described below. First, the motor inspection device 11 conducts shipment inspection of a motor in its shipment to obtain information (X1$n$) concerning the inspection conducted in shipment. Examples of the shipment inspection information (X1$n$) of each motor may include the type (model), the inspection date, the insulation resistance value, the winding resistance value, the back electromotive force value, and the current value and the shaft friction torque value during driving for this motor, and the shipment inspection information (X1$n$) is recorded in a storage device (e.g., a nonvolatile storage device such as a hard disk drive or a flash memory).

After the motors are shipped, operation alarm information ($X2n$) during the operation of each motor is acquired. Examples of the operation alarm information ($X2n$) of each motor may include the details of an alarm, the time until the occurrence of the alarm, and the velocity, the torque, the current, and the temperature upon the occurrence of the alarm, and the operation alarm information ($X2n$) is recorded in a storage device. Examples of the types of alarms may include an overcurrent alarm, a noise alarm (an alarm issued when noise is present at a predetermined level or more or an alarm issued upon the occurrence of a communication error), an overload alarm (an alarm issued upon motor overheating), and an excessive error upon movement.

The shipment inspection information ($X1n$) of each individual motor is stored in, e.g., a server (server storage device) of a manufacturer of a motor or a product which uses the motor. The operation alarm information ($X2n$) of each individual motor is temporarily stored in, e.g., a storage device of the controller 12 that controls the motor, and is copied from the controller 12 to the server of the manufacturer by the service engineer of the manufacturer and stored. Alternatively, the operation alarm information ($X2n$) of each individual motor may be configured to be, e.g., directly uploaded from the motor controller 12 to the server of the manufacturer via a communication line such as the internet. Hence, the machine learning device 2 located on the server of the manufacturer, for example, may perform learning (processing) using the shipment inspection information ($X1n$) and the operation alarm information ($X2n$) of each individual motor as input.

Processing by the machine learning device according to this embodiment located on the server of the manufacturer, for example, will be described below. First, from shipment inspection information ($X1n$) and operation alarm information ($X2n$) for a motor, a correlation between ($X1n$) and ($X2n$) is generated as a learning model, and shipment inspection items (a1, a2, a3, a4, . . . ) belonging to the shipment inspection information ($X1n$) for the motor that influences the operation alarm information ($X2n$) are output from the learning model.

For faults involving specific alarms (e.g., a ground fault of a motor involving an overcurrent alarm, and demagnetization of the motor involving an overheat alarm), the rate of occurrence of faults may be predicted on the basis of, e.g., information (shipment inspection information) concerning the shipment inspection items of motors still operating without any problem from shipment inspection information ($X1n$) for the motor which influences an alarm. In other words, the rate of occurrence of faults of a certain motor in operation may be predicted on the basis of, e.g., the shipment inspection information of the certain motor from the correlation between shipment inspection information ($X1n$) and operation alarm information ($X2n$) for the motor. The effects obtained from the correlation between shipment inspection information and operation alarm information for a motor (object) are not limited to such prediction of the rate of occurrence of faults of the motor, and various effects may be obtained, as a matter of course.

Regarding, e.g., demagnetization of a motor involving an overheat alarm, its cause may be estimated and a prompt measure may be taken as follows: when the back electromotive force in the shipment inspection information (shipment inspection) is concerned, magnet selection in design or magnet magnetization, for example, may be estimated to be responsible; when the winding resistance in the shipment inspection information is concerned, winding in the manufacture, for example, may be estimated to be responsible; or when the shaft friction resistance value in the shipment inspection information is concerned, an increase in friction resistance because of damage inflicted on the bearing in the manufacture, for example, may be estimated to be responsible.

When the rate of occurrence of a specific alarm increases after a certain shipment date, a point of change in a component used, a manufacturing facility, or the like, for example, may be estimated to be responsible. When the rate of occurrence of alarms increases for a specific model, factors unique to the model in design, for example, may be estimated to be responsible. In any case, confirming the correlation between shipment inspection information and operation alarm information allows prediction of the rate of occurrence of faults for each individual motor operating in the field, and even allows effective limitation or the like of a target for a measure against the faults when such a measure is taken.

Although a motor has been taken as an example of the object in the foregoing description, a servo amplifier which performs servo driving of a motor will be exemplified as the object below. In this case, the shipment inspection information ($X1n$) of the servo amplifier includes the model of the servo amplifier, and the inspection results of inspection items associated with the inspection date of the servo amplifier. More specifically, the shipment inspection information ($X1n$) of the servo amplifier includes, e.g., the insulation resistance value, the earth resistance value, the current value, and the switching surge voltage for the servo amplifier, and the operation alarm information ($X2n$) of the servo amplifier includes, e.g., an overcurrent alarm, a noise alarm, and an overload alarm (overheating amplifier) for the servo amplifier. Examples of the correlation obtained by the machine learning device (machine learning method) according to this embodiment may include various correlations such as that between the surge voltage in the shipment inspection information and an alarm for a communication error (noise alarm) in the operation alarm information, and that between the earth resistance in the shipment inspection information and an alarm for a communication error in the operation alarm information, as in the case where a motor is assumed as the object. Obtaining a correlation between shipment inspection information and operation alarm information for an object leads to solutions to various problems such as improvements in shipment inspection items, and structural upgrading, life determination, and an improvement in quality of the object, as described earlier.

The machine learning device and the machine learning method according to the present invention have the effect of obtaining a correlation between shipment inspection information and operation alarm information for an object.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning a correlation between shipment inspection information and operation alarm information, the machine learning device comprising:
a neural network; and
a processor configured to
observe the shipment inspection information obtained by inspecting an object before shipment thereof, and the operation alarm information issued during operation of the object after shipment, wherein the operation alarm information includes an increased rate of occurrence of a specific alarm after a shipment date, and
generate a learning model based on the shipment inspection information and the operation alarm information, wherein
the object comprises a motor,
the shipment inspection information comprises inspection results of inspection items associated with a model of the motor and an inspection date of the motor, an insulation resistance value, an earth resistance value, a current value, and a switching surge voltage for the motor, and the operation alarm information comprises an overcurrent alarm, a noise alarm, and an overload alarm for the motor, and
the processor is configured to generate the learning model by clustering the shipment inspection information and the operation alarm information.

2. The machine learning device according to claim 1, wherein
the processor is configured to generate a distribution correlation between the shipment inspection information and the operation alarm information as the learning model.

3. The machine learning device according to claim 1, further comprising:
an output device configured to output an inspection item, which belongs to the shipment inspection information and influences an alarm issued during the operation of the object, based on the learning model generated by the processor.

4. The machine learning device according to claim 1, wherein
the processor is configured to generate the learning model by hierarchical clustering in which the shipment inspection information and the operation alarm information are arithmetically processed in a hierarchical structure, and nonhierarchical clustering in which the shipment inspection information and the operation alarm information are arithmetically processed until a predetermined number is reached based on a distance between nodes.

5. The machine learning device according to claim 1, wherein
the machine learning device is connectable to at least one different machine learning device and is configured to exchange or share the learning model generated by the processor of the machine learning device with the at least one different machine learning device.

6. The machine learning device according to claim 5, wherein
the machine learning device is located on a first cloud server, and
the different machine learning device is located on a second cloud server different from the first cloud server.

7. The machine learning device according to claim 1, wherein
the machine learning device is configured on a server of a manufacturer of the object,
the server is configured to store the shipment inspection information, which was obtained by inspecting the object before the shipment thereof to a user,
the server is further configured to obtain the operation alarm information, which was issued during the operation of the object and temporarily stored in a storage device of a controller controlling the operation of the object after the object being delivered to the user.

8. A machine learning device for learning a correlation between shipment inspection information and operation alarm information, the machine learning device comprising:
a neural network; and
a processor configured to
observe the shipment inspection information obtained by inspecting an object before shipment thereof, and the operation alarm information issued during operation of the object after shipment, wherein the operation alarm information includes an increased rate of occurrence of a specific alarm after a shipment date, and
generate a learning model based on the shipment inspection information and the operation alarm information, wherein
the object comprises a servo amplifier configured to perform servo driving of a motor,
the shipment inspection information comprises inspection results of inspection items associated with a model of the servo amplifier and an inspection date of the servo amplifier, an insulation resistance value, an earth resistance value, a current value, and a switching surge voltage for the servo amplifier,
the operation alarm information comprises an overcurrent alarm, a noise alarm, and an overload alarm for the servo amplifier, and
the processor is configured to generate the learning model by clustering the shipment inspection information and the operation alarm information.

9. The machine learning device according to claim 8, wherein
the processor is configured to generate a distribution correlation between the shipment inspection information and the operation alarm information as the learning model.

10. The machine learning device according to claim 8, further comprising:
an output device configured to output an inspection item, which belongs to the shipment inspection information and influences an alarm issued during the operation of the object, based on the learning model generated by the processor.

11. The machine learning device according to claim 8, wherein
the processor is configured to generate the learning model by hierarchical clustering in which the shipment inspection information and the operation alarm information are arithmetically processed in a hierarchical structure, and nonhierarchical clustering in which the shipment inspection information and the operation alarm information are arithmetically processed until a predetermined number is reached based on a distance between nodes.

12. The machine learning device according to claim 8, wherein
the machine learning device is connectable to at least one different machine learning device and is configured to exchange or share the learning model generated by the processor of the machine learning device with the at least one different machine learning device.

13. The machine learning device according to claim 12, wherein
the machine learning device is located on a first cloud server, and
the different machine learning device is located on a second cloud server different from the first cloud server.

14. A machine learning method of learning a correlation between shipment inspection information and operation alarm information, the machine learning method comprising:
obtaining the shipment inspection information by inspecting an object before shipment thereof;
obtaining the operation alarm information issued during operation of the object after shipment;
observing the shipment inspection information and the operation alarm information, wherein the operation alarm information includes an increased rate of occurrence of a specific alarm after a shipment date; and
generating, using a neural network, a learning model based on the observed shipment inspection information and operation alarm information, wherein
the object comprises a motor,
the shipment inspection information comprises inspection results of inspection items associated with a model of the motor and an inspection date of the motor, an insulation resistance value, an earth resistance value, a current value, and a switching surge voltage for the motor,
the operation alarm information comprises an overcurrent alarm, a noise alarm, and an overload alarm for the motor, and
said generating the learning model comprises clustering
the shipment inspection information obtained by inspecting the object before shipment of the object, and
the operation alarm information issued during operation of the object after shipment of the object.

15. The machine learning method according to claim 14, wherein
the generating the learning model comprises generating a distribution correlation between the shipment inspection information and the operation alarm information as the learning model.

16. The machine learning method according to claim 14, wherein
said generating the learning model is performed by a server of a manufacturer of the object,
said method further comprising:
storing, at the server, the shipment inspection information, which was obtained by inspecting the object before the shipment thereof to a user; and
obtaining, by the server, the operation alarm information, which was issued during the operation of the object and temporarily stored in a storage device of a controller controlling the operation of the object after the object being delivered to the user.

17. A machine learning method of learning a correlation between shipment inspection information and operation alarm information, the machine learning method comprising:
obtaining the shipment inspection information by inspecting an object before shipment thereof;
obtaining the operation alarm information issued during operation of the object;
observing the shipment inspection information and the operation alarm information, wherein the operation alarm information includes an increased rate of occurrence of a specific alarm after a shipment date; and
generating, using a neural network, a learning model based on the observed shipment inspection information and operation alarm information, wherein
the object comprises a servo amplifier configured to perform servo driving of a motor,
the shipment inspection information comprises inspection results of inspection items associated with a model of the servo amplifier and an inspection date of the servo amplifier, an insulation resistance value, an earth resistance value, a current value, and a switching surge voltage for the servo amplifier, and
the operation alarm information comprises an overcurrent alarm, a noise alarm, and an overload alarm for the servo amplifier.

18. The machine learning method according to claim 17, wherein
the generating the learning model comprises generating a distribution correlation between the shipment inspection information and the operation alarm information as the learning model.

* * * * *